US012768695B2

(12) United States Patent
Sabraoui et al.

(10) Patent No.: US 12,768,695 B2
(45) Date of Patent: Oct. 20, 2026

(54) METHOD FOR MANAGING A COMMUNICATING METER

(71) Applicant: SAGEMCOM ENERGY & TELECOM SAS, Rueil Malmaison (FR)

(72) Inventors: Abbas Sabraoui, Rueil Malmaison (FR); Ahmet Samet Basturk, Rueil Malmaison (FR); Oussama Abid, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 0 days.

(21) Appl. No.: 18/214,107

(22) Filed: Jun. 26, 2023

(65) Prior Publication Data

US 2024/0003728 A1 Jan. 4, 2024

(30) Foreign Application Priority Data

Jun. 29, 2022 (FR) ....................................... 2206570

(51) Int. Cl.
*G01F 15/00* (2006.01)
*G01F 15/063* (2022.01)
(Continued)

(52) U.S. Cl.
CPC .......... *G01F 15/003* (2013.01); *G01F 15/063* (2013.01)

(58) Field of Classification Search
CPC ...... G01F 15/003; G01F 15/063; G01F 25/10; G06F 1/3212; G06Q 50/06; H04Q 9/00
(Continued)

(56) References Cited

U.S. PATENT DOCUMENTS 4,918,995 A 4/1990 Pearman et al.
11,320,347 B1 5/2022 Borad et al.
(Continued)

FOREIGN PATENT DOCUMENTS

EP 2 034 281 A1 3/2009
JP S60-190814 A 9/1985

OTHER PUBLICATIONS

Feb. 13, 2023 Search Report issued in French Patent Application No. 2206570.

*Primary Examiner* — Michael P Nghiem
(74) *Attorney, Agent, or Firm* — Williams Mullen; R. Brian Drozd

(57) ABSTRACT

A method for managing a communicating meter, for measuring consumption of a fluid, the meter including a measurement unit for acquiring measurements of consumption of the fluid at a parameterisable frequency. The method is implemented by the communicating meter and the method includes the following steps: acquiring at least one value of the consumption flow rate (d(t)) of the fluid at an active parameterisable frequency ($f_{act}$), (e) updating the active parameterisable frequency ($f_{act}$) at least according to the value of the flow rate (d(t)) acquired, according to at least one other flow rate value previously acquired and according to a frequency determined from a non-zero probability (p(t)) of a variation in consumption flow rate of the fluid higher than a flow rate variation threshold, and reimplementation of the method with the updated active parameterisable frequency.

8 Claims, 4 Drawing Sheets

(51) Int. Cl.
*G01F 25/10* (2022.01)
*G06F 1/3212* (2019.01)
*G06Q 50/06* (2024.01)
*H04Q 9/00* (2006.01)

(58) Field of Classification Search
USPC ........................................................ 702/45
See application file for complete search history.

(56) References Cited

U.S. PATENT DOCUMENTS

| | | | | |
|---|---|---|---|---|
| 2009/0064796 | A1* | 3/2009 | Mehendale | G01F 1/8413<br>73/861.356 |
| 2012/0304779 | A1 | 12/2012 | Ono et al. | |
| 2018/0318475 | A1* | 11/2018 | Thomson | A61M 1/90 |

* cited by examiner

METHOD FOR MANAGING A COMMUNICATING METER

TECHNICAL FIELD

The invention relates to the field of communicating meters comprising a measurement unit and relates more particularly to the field of managing communicating meters to reduce the energy consumption of the communicating meter.

PRIOR ART

As is known, the Internet of Things (IoT) is continually expanding. The Internet of Things represents the extension of the internet to things and to places in the physical world. Whereas the internet does not normally extend beyond the electronic world, the Internet of Things represents exchanges of information and data coming from devices present in the real world to the internet, such as for example for collecting water consumption readings or for the remote monitoring of environmental conditions (temperature, pressure, etc). The Internet of Things is considered to be the third evolution of the internet, termed Web 3.0. The Internet of Things has a universal character for designating connected objects with varied uses, for example in the field of e-health or home automation.

A first approach adopted for interconnecting objects, referred to as communicating objects ("IoT device"), in the context of the Internet of Things, relies on a deployment, controlled by an operator, of collecting gateways located on geographically high points. Apart from maintenance operations, these gateways are fixed and permanent. The SigFox (registered trade mark) or ThingPark (registered trade mark) networks can for example be cited with regard to this model. For example, in France, the SigFox (registered trade mark) network relies on high points of the TDF («Télédiffusion de France») transmission sites. These collecting gateways communicate with the communicating objects by means of medium- or long-range radio communication systems (e.g. the LoRa (registered trade mark) system of the company Semtech). This approach relies on a limited number of collecting gateways (difficulty in deploying new network infrastructures), as well as on a reliable and secure uplink access with one or more collecting servers.

A second approach consists of connecting communicating objects through residential gateways. Mention can for example be made of the Energy Gateway technology. A system according to the Energy Gateway technology is composed of two distinct parts: firstly a residential gateway and peripheral sensors, which are hosted at the consumer and which allow the collection of information, the transmission of this information to a collecting server, and control of the triggering of various actions (control of the triggering of radiators or of the water heater for example); secondly, the collecting server that provides the making available of the information received and the transmission of commands for controlling triggering of various actions. This collecting server is accessible via the internet. The radio technologies used for communicating with the communicating objects according to this second approach are of relatively short range (for example of the Zigbee (registered trade mark), Bluetooth (registered trade mark) or Wi-Fi (registered trade mark) type) for serving a local collection restricted to the objects in the dwelling.

Such communicating objects typically comprise one or more sensors, and are typically supplied by cells (or batteries). One difficulty lies in preserving the service life of the cell, and more particularly in guaranteeing the operation of the essential functionalities of such communicating objects throughout the service life of the cells.

When the communicating objects are used for measuring consumption of a fluid, it is recognised that the frequency of the measurements greatly influences the precision of the measurement of the consumption. The greater the frequency of the measurements, the more precise is the measurement. On the other hand, the greater the frequency of the measurements, the greater the consumption of electrical energy, which is detrimental to the service life of the cell for providing the electrical energy to the communicating object.

It is desirable to overcome these drawbacks of the prior art. It is in particular desirable to provide a solution that makes it possible to ensure the integrity of the data stored and/or supplied by these communicating objects when their cells arrive at the end of their life, and this while minimising the extra hardware cost that such a solution would entail. It should be noted that extra hardware cost generally gives rise to a greater space requirement (for example, capacitive elements are more expensive and more bulky than transistors or resistors).

Thus it is desirable to provide a method for managing a communicating object making it possible to reduce the electrical consumption of the communicating meter while guaranteeing optimum precision in the measurement of a fluid consumption.

The communicating objects are for example communicating meters and the invention makes it possible to extend the ability of the cells to provide electrical energy to the communicating meter throughout a predefined period while guaranteeing optimum measurements of fluid consumption (gas, water, etc).

BRIEF SUMMARY OF THE INVENTION

For this purpose, according to a first aspect, a method is proposed for managing a communicating meter, for measuring consumption of a fluid, the meter comprising a measurement unit for acquiring measurements of consumption of the fluid at a parameterisable frequency. The method is implemented by the communicating meter and the method comprises the following steps:

(a) acquiring at least one value of the consumption flow rate of the fluid at an active parameterisable frequency, (e) updating the active parameterisable frequency at least according to the value of the flow rate acquired, according to at least one other flow rate value previously acquired and according to a frequency determined from a non-zero probability of a variation in consumption flow rate of the fluid higher than a flow rate variation threshold, and reimplementation of the method with the updated active parameterisable frequency.

Particularly advantageously, the management method makes it possible to vary the measurement frequency according to the value of the flow rate d of the fluid or according to the variation in the flow rate of the fluid. Thus, in other words, this makes it possible to increase the measurement frequency when the flow rate increases and, conversely, this makes it possible to reduce the measurement frequency when the flow rate is interrupted or low.

According to a particular provision, the method comprises the following steps:

(b) incrementing the value of an increment by a number of acquisitions of values of the flow rate acquired at the active parameterisable frequency, (c) comparing the value of the increment with a threshold value, (d) if the value of the increment is lower than the threshold value, maintaining the active parameterisable frequency to acquire at least one new measurement at the active parameterisable frequency, (e) if the value of the increment is at least equal to the threshold value, updating the active parameterisable frequency at least according to the value of the flow rate acquired, according to at least one other flow rate value previously acquired and according to a frequency determined from a non-zero probability of a variation in consumption flow rate of the fluid higher than a flow rate variation threshold, and reimplementation of the method with the updated active parameterisable frequency.

According to a particular provision, the active parameterisable frequency is updated according to a first frequency determined according to the flow rate value acquired, the first frequency being determined as follows:

$$f_1 = \frac{d(t) - d_{min}}{d_{max} - d_{min}} \cdot [f_{max} - f_{min}] + f_{min}$$

with: $f_{min}$ a predetermined minimum frequency, $f_{max}$ a predetermined maximum frequency, $d_{min}$ a measurable minimum flow rate value and $d_{max}$ a measurable maximum flow rate value, and d(t) a flow rate value measured at an instant t.

According to a particular provision, the active parameterisable frequency is updated according to a second frequency determined according to a variation in the flow rate value acquired with respect to at least one value of the previously acquired flow rate, the second frequency being determined as follows:

$$f_2 = \frac{\frac{d(t) - d(t-i)}{i} - d'_{min}}{d'_{max} - d'_{min}} \cdot [f_{max} - f_{min}] + f_{min}$$

with d(t–i) another previously acquired flow rate value, and i a time of a previous measurement, d'min a minimum variation in the flow rate, and d'max a maximum variation in the flow rate.

According to a particular provision, the frequency determined from the non-zero probability of consumption flow rate of the fluid higher than the flow rate threshold is obtained from a plurality of measurements of values of the consumption flow rate of the fluid acquired during a period of time at least equal to one day and the frequency determined from said non-zero probability is proportional to said non-zero probability.

According to a particular provision, the active parameterisable frequency is updated as follows:

$$f_{act} = \frac{1}{3}\sum_{j=1}^{3} a_j \cdot f_j$$

According to a particular provision, the active parameterisable frequency is updated as follows:

$$f_{act} = \max(f_1, f_2, f_3).$$

According to a particular provision, the method comprises a step (f) in which the active parameterisable frequency is compared with a predetermined frequency threshold and, if the active parameterisable frequency is strictly lower than the predetermined frequency threshold, then the threshold value N is maintained and, if the active parameterisable frequency is higher than or equal to the predetermined frequency threshold, then the threshold value N is defined by another predetermined threshold value.

According to another aspect, a computer program product is proposed, comprising program code instructions for executing the management method, when said instructions are executed by a processor.

According to another aspect, a non-transient storage medium is proposed, on which a computer program product is stored, comprising program code instructions for executing the management method, when said instructions are read from said non-transient storage medium and executed by a processor.

According to another aspect, a communicating meter is proposed, for measuring consumption of a fluid, the communicating meter comprising a measurement unit for acquiring measurements of consumption of the fluid at a parameterisable frequency, characterised in that the communicating meter comprises electronic circuitry configured for:

(a) acquiring at least one value of the consumption flow rate of the fluid at an active parameterisable frequency, (e) updating the active parameterisable frequency at least according to the value of the flow rate acquired, according to at least one other flow rate value previously acquired and according to a frequency determined from a non-zero probability of a variation in consumption flow rate of the fluid higher than a flow rate variation threshold, and reimplementation of the method with the updated active parameterisable frequency.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Communicating Meter Supplied by Cell

Figure 1:
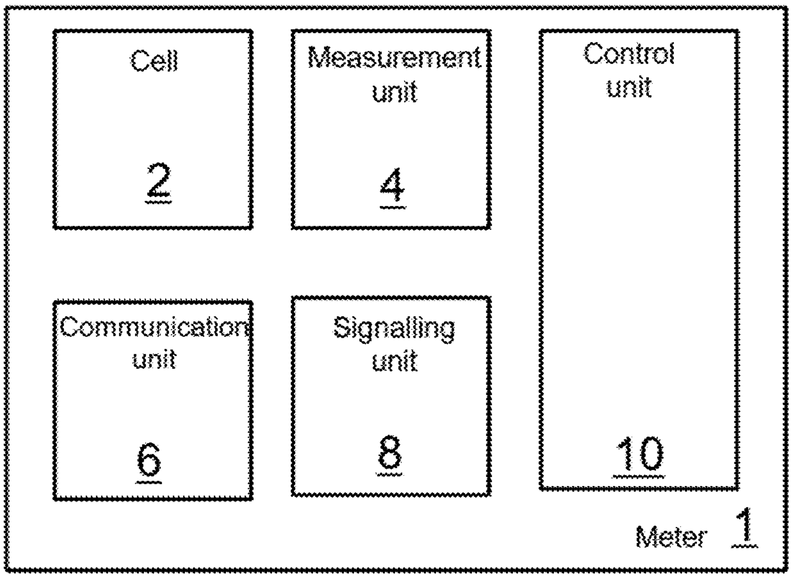
FIG. 1 illustrates schematically an algorithm of a method for managing a communicating meter.

With reference to FIG. 1, a communicating object supplied by a cell 2 and/or by a connection to an electrical supply network is proposed. The term 'cell' is must be understood as being a single cell, or a set of cells providing conjointly an autonomous source of electrical energy.

The present invention is described in a particular embodiment where the communicating object is a fluid meter 1, i.e.

adapted and configured to measure a consumption of a fluid (water, gas, etc). The present invention is also applicable to communicating objects such as sensors for temperature, pressure, humidity, etc.

According to the embodiment here presented, the meter 1 comprises in particular a measurement unit 4 for acquiring measurements, a communication unit 6, a signalling unit 8 for sending alarm signals, and a control unit 10.

Typically, the measurement unit 4 can be adapted and configured to measure a consumption of water, or a consumption of another fluid such as gas. In this regard, the measurement unit 4 comprises known means for measuring (metrology) and monitoring a consumption of water.

The communication unit 6 comprises a set of communication members allowing the transmission of measurements acquired by the measurement unit 4, for example to a collecting gateway or to a residential gateway.

Typically, the communication unit 6 comprises members for communication via a telephone network, via the internet (protocols for communication on IP), via a LoRa (registered trade mark) system of the company Semtech, via a Wi-Fi system (registered trade mark), via a system of the Zigbee (registered trade mark) type, or via a system of the Bluetooth (registered trade mark) type. According to a particular provision, the communication unit 6 comprises members for communication via cellular networks of the LPWAN («Low Power Wide Area Network») type dedicated to connected objects.

As will be detailed below, the meter 1, through its communication unit 6, can favour certain communication channels according to the state of charge of the battery 2 and according to the nature of the data to be transmitted.

The signalling unit 8 comprises electronic circuitry for sending alarm signals. Typically, the signalling unit 8 may comprise members allowing the sending of optical signals (for example light-emitting diodes). In addition, the signalling unit 8 can transmit alarm signals via the communication unit 6 to transmit the alarm signals to remote units via wireless systems as stated previously.

The control unit 10 comprises electronic circuitry for controlling and coordinating all the previously mentioned units (measurement unit 4, communication unit 6, signalling unit 8). Furthermore, the control unit 10 is adapted to implement a management method detailed below.

Figure 2:
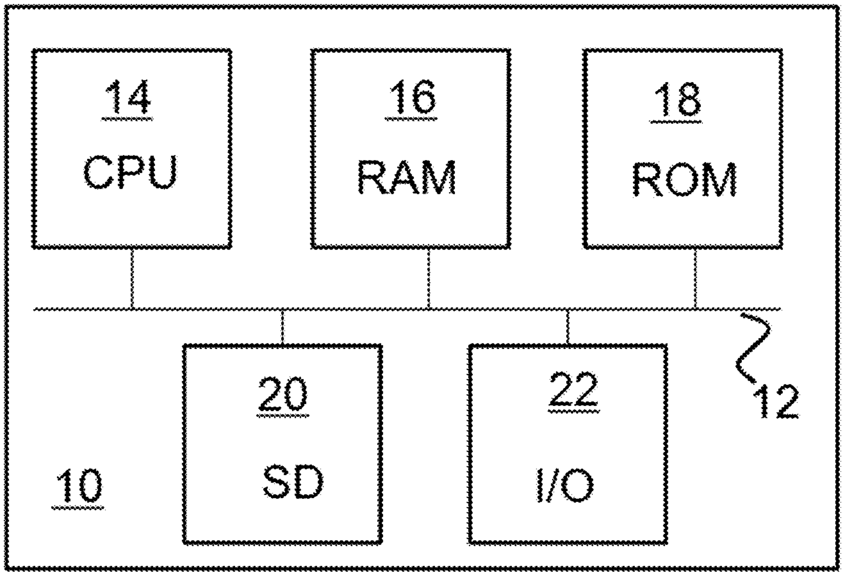
FIG. 2 illustrates schematically an example of hardware architecture of a control unit of a communicating meter.

FIG. 2 illustrates rates schematically an example of hardware architecture of the control unit 10. According to this example, the control unit 10 comprises, connected by a communication bus 12: a processor or CPU ("central processing unit") 14; a random access memory (RAM) 16; a read only memory (ROM) 18; a storage unit or a storage medium reader, such as an SD ("Secure Digital") card reader 20; a set of interfaces 22 enabling the control unit 10 to communicate with the other elements of the hardware architecture presented above in relation to FIG. 1.

The processor 14 is capable of executing instructions loaded in the RAM 16 from the ROM 18, from an external memory, from a storage medium, or optionally from a communication network. When the control unit 10 is powered up, the processor 14 is capable of reading instructions from the RAM 16 and executing them. These instructions form a computer program causing the implementation, by the processor 14, of all or part of the management method described hereinafter.

Thus all or part of the management method described hereinafter can be implemented in software form by executing a set of instructions by a programmable machine, such as a DSP ("digital signal processor"), or a microcontroller. All or part of the algorithms and steps described here can also be implemented in hardware form by a machine or a dedicated component, such as an FPGA ("field-programmable gate array"), or an ASIC ("application-specific integrated circuit").

Management Method

According to a second aspect, a method 100 is proposed for managing a communicating meter, for measuring consumption of a fluid.

Figure 3:
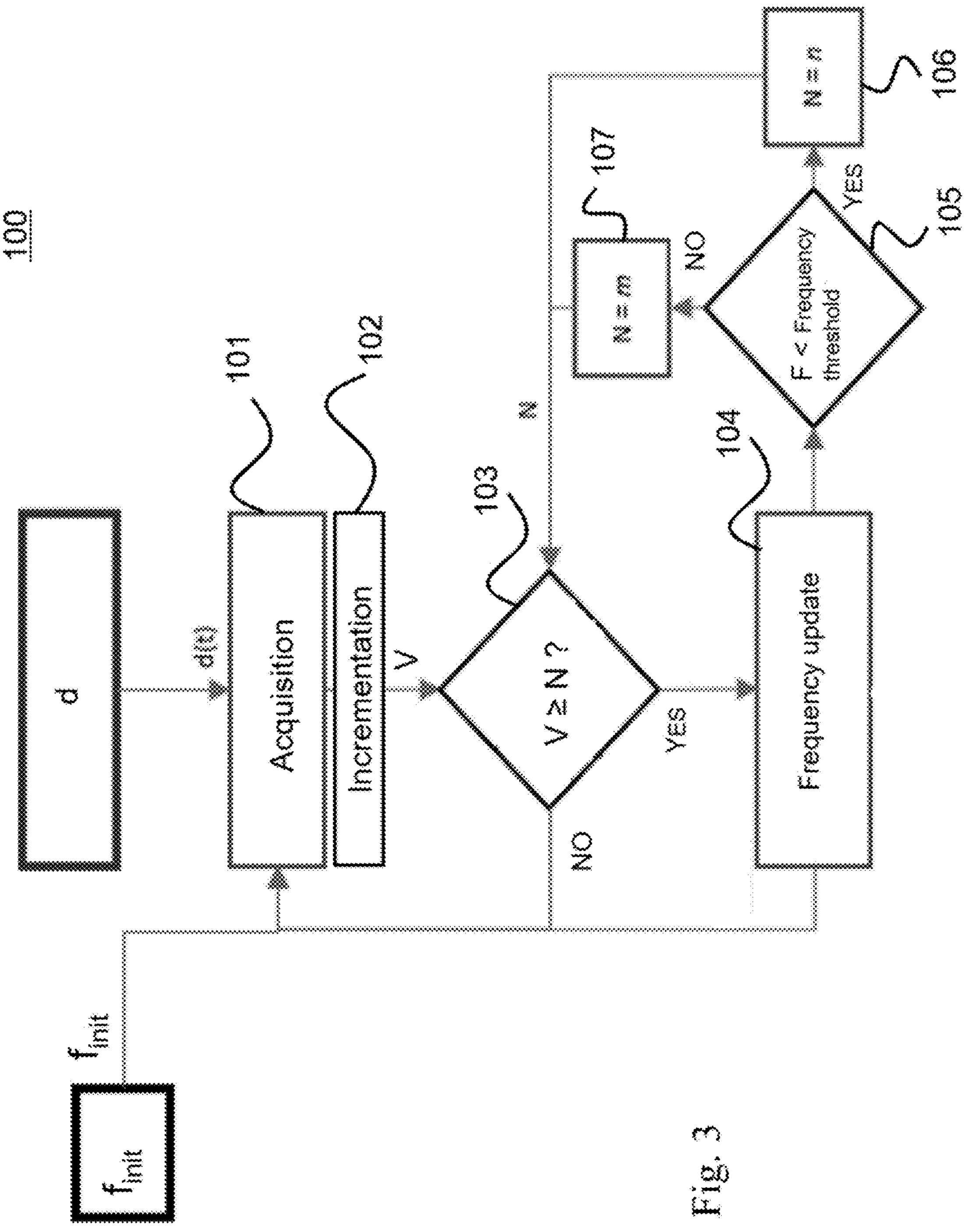
FIG. 3 illustrates schematically an algorithm of a method for managing a communicating meter.

As shown schematically on FIG. 3, the management method 100 principally comprises the following steps:

(a) Acquiring (step 101) at least one value of the consumption flow rate d(t) of the fluid at an active parameterisable frequency $f_{act}$, (e) Updating (step 104) the active parameterisable frequency $f_{act}$ at least according to the value of the flow rate d(t) acquired, according to at least one other flow rate value previously acquired and according to a frequency determined from a non-zero probability p(t) of a variation in consumption flow rate of the fluid higher than a flow rate variation threshold, and reimplementation of the method with the updated active parameterisable frequency.

As will be described below, the method 100 may comprise additional steps.

Thus, particularly advantageously, the method 100 makes it possible to adapt the measurement frequency (i.e. the active parameterisable frequency) according to the value of the flow rate, according to the variation or according to a non-zero probability of variation in the flow rate. Adapting the value of the frequency makes it possible to regulate the electrical consumption of the meter according to a requirement for a measurement precision related to the value of the flow rate.

It is specified that, according to a particular provision, when the meter 1 starts up, i.e. when the method 100 begins without data being recorded in memory, the active frequency is defined by a predetermined value ($f_{init}$) that can be selected by a user or be defined in advance, for example in the context of factory pre-settings.

Thus, according to a situation given by way of example, when the meter 1 is started up, the method 100 begins to be implemented and the active frequency can for example be fixed at 5 Hz or 10 Hz. If a user begins to consume fluid, the flow rate may for example change from 0 L/h to 100 L/h in 0.1 seconds. Thus, according to this example, the variation in the flow rate would be 1000 L/h/s. According to this example the value of the flow rate at 100 L/h might be insufficient to require a change in active parameterisable frequency. On the other hand, the value of the variation might require an updating of the active parameterisable frequency, to optimise the precision of measurement in the face of a large variation in the flow rate.

According to another example, the user is not consuming fluid, and therefore the value of the flow rate is 0 L/h and the variation in the flow rate is zero. However, at this instant, there is a strong probability (for example 70% chance) of the user consuming fluid. Therefore, by taking account of this probability, the method updates the active parameterisable frequency.

Figure 5:
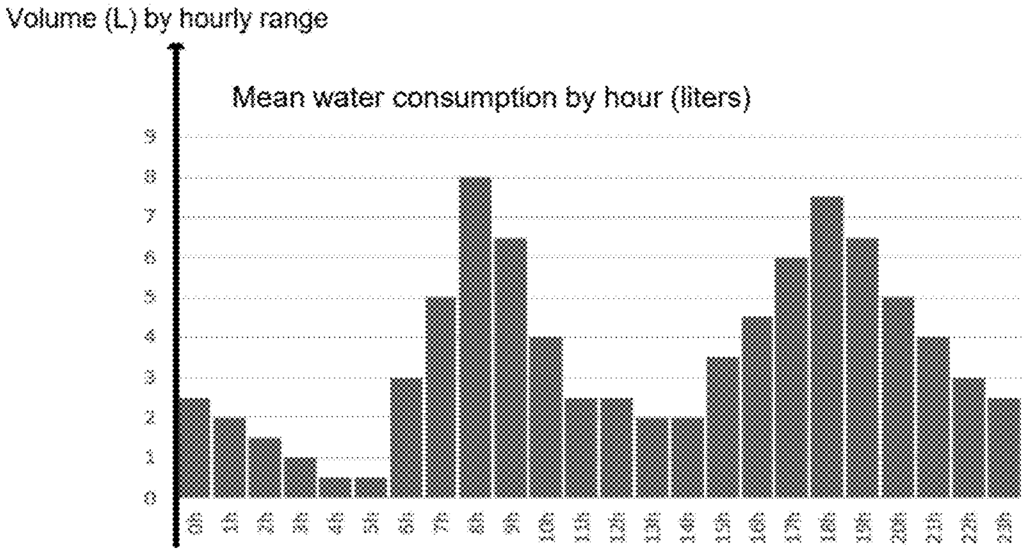
FIG. 5 is a graph of a mean water consumption by hour.
Figure 6:
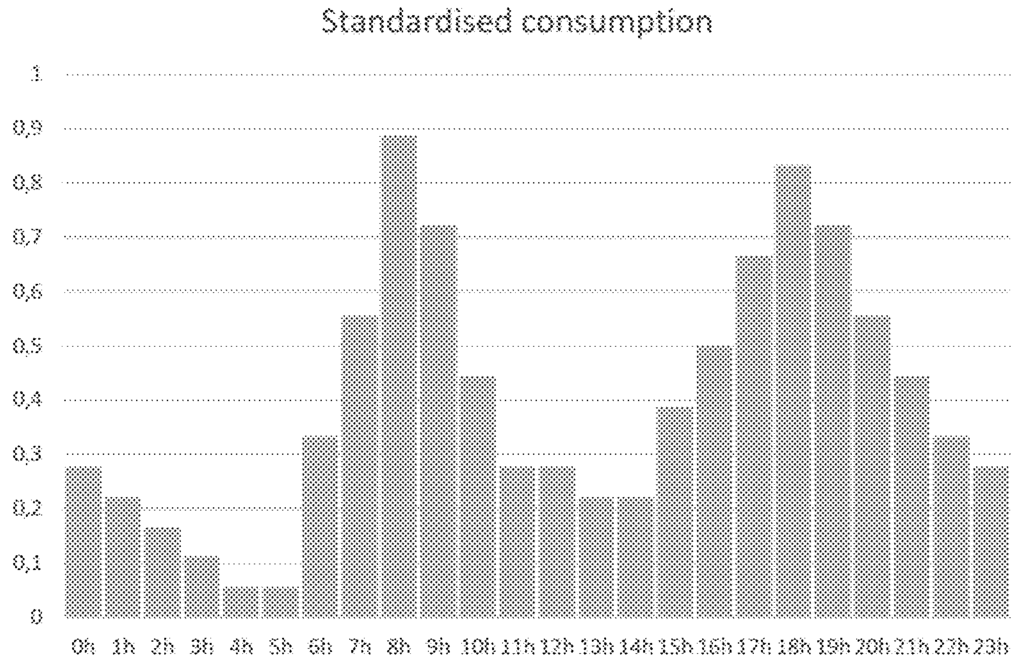
FIG. 6 is a graph of a standardisation of the data of the graph of mean water consumption by hour.

More precisely, according to one embodiment, the probability used is a probability initially determined for each time range when the meter 1 was installed (i.e. when the meter 1 was first started up). This probability is determined from known consumption data in a set of meters 1. This probability can also be determined from known general consumption data. FIG. 5 shows schematically a graph of mean water consumption by hour that can typically be used to determine the consumption probability (in the case where the meter 1 is a water meter). A standardisation of the data in FIG. 5 is shown schematically on FIG. 6. According to one embodiment, the standardised data of FIG. 6 are used to determine an initial measurement frequency for each time range. As shown schematically on FIG. 6, the standardised values lie between 0 and 1. The closer a standardised value is to 1, the higher the probability. According to a particular provision, the consumption probability is updated according to consumption data measured by the meter 1. According to one embodiment the probability is updated every week.

According to a particular provision, the method incorporates additional steps for taking account of a number of measurements made before the measurement frequency is updated.

According to this provision, the method comprises the following steps:

(a) Acquiring (step 101) at least one value of the consumption flow rate d(t) of the fluid at an active parameterisable frequency $f_{act}$. Typically, this step is performed by the measurement unit 4 of the meter.

(b) Incrementing the value V (step 102) of an increment by a number of acquisitions of values of the flow rate acquired at the active parameterisable frequency $f_{act}$. In other words, for each acquisition made at the step (a), an increment is incremented by an additional discrete value V.

(c) Comparing (step 103) the value V of the increment with a threshold value N. As will be described below, the threshold value N is a predetermined value that can vary according to the value of the active parameterisable frequency $f_{act}$.

(d) If the value V of the increment is lower than the threshold value N, maintaining the active parameterisable frequency $f_{act}$ to acquire at least one new measurement at the active parameterisable frequency. In other words, as long as the value V of the increment does not reach the predetermined threshold N, the active parameterisable frequency is kept unchanged $f_{act}$.

(e) If the value is at least equal to the threshold value, updating (step 104) the active parameterisable frequency $f_{act}$ at least according to the value of the flow rate d(t) acquired, according to at least one other flow rate value previously acquired and according to a frequency obtained from a non-zero probability (p(t)) of a variation in consumption flow rate of the fluid higher than a flow rate variation threshold, and performing the acquisition step with the active parameterisable frequency and steps of incrementation, comparison and maintenance or updating.

Figure 4:
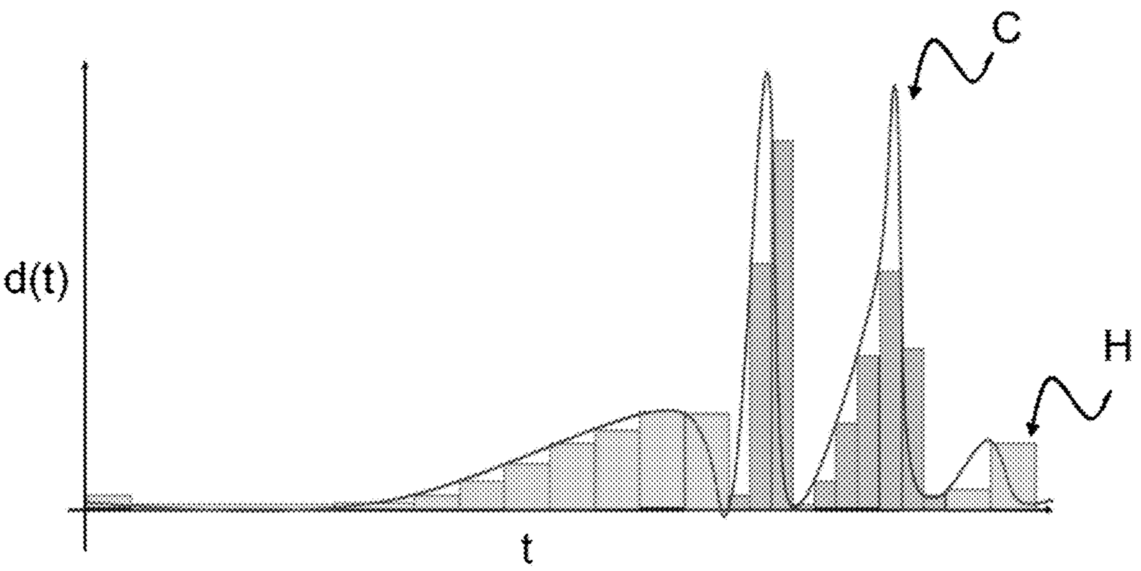
FIG. 4 is a graph illustrating the adaptation of a measurement frequency to a fluid consumption.

In practice, the method 100 makes it possible to vary the measurement frequency according to the value of the flow rate d of the fluid or according to the variation in the flow rate of the fluid. Thus, in other words, this makes it possible to increase the measurement frequency when the flow rate increases and, conversely, this makes it possible to reduce the measurement frequency when the flow rate is interrupted or low. With reference to FIG. 4, the curve C represents the variations in the flow rate and the histograms H represent periods and increases in frequency. The height (on the Y axis) of each histogram corresponds to a frequency: the higher the histogram the higher the frequency. The width (on the X axis) of each histogram corresponds to a duration: the wider the histogram the longer has the frequency been maintained. On FIG. 4, it is thus observed that the method 100 allows an adaptation of the frequency to the flow rate, which makes it possible to guarantee a precise measurement of the flow rate (and therefore of the consumption), while making it possible to optimise the electrical consumption of the meter (the lower the measurement frequency, the lower the electrical consumption).

First Frequency Determined for Updating the Active Parameterisable Frequency

According to a particular provision, the active parameterisable frequency ($f_{act}$) is updated according to a first frequency ($f_1$) determined according to the measurement acquired d(t), the first frequency being determined as follows:

$$f_1 = \frac{d(t) - d_{min}}{d_{max} - d_{min}} \cdot [f_{max} - f_{min}] + f_{min}$$

with: $f_{min}$ a predetermined minimum frequency, $f_{max}$ a predetermined maximum frequency, $d_{min}$ a measurable minimum value and $d_{max}$ a measurable maximum value, and d(t) a flow rate value measured at an instant t.

Second Frequency Determined for Updating the Active Parameterisable Frequency

According to a particular provision, the active parameterisable frequency ($f_{act}$) is updated according to a second frequency ($f_2$) determined according to a variation in the flow rate value acquired with respect to at least one value of the previously acquired flow rate, the second frequency being determined as follows:

$$f_2 = \frac{\frac{d(t) - d(t-i)}{i} - d'_{min}}{d'_{max} - d'_{min}} \cdot [f_{max} - f_{min}] + f_{min}$$

with d(t–i) another previously acquired flow rate value, and i a time of a previous measurement, d'min a minimum variation in the flow rate, and d'max a maximum variation in the flow rate.

It is specified that d'min, the minimum variation in the flow rate, and d'max, the maximum variation in the flow rate, are predetermined values that can be fixed by a user of the meter 1.

Third Frequency Determined for Updating the Active Parameterisable Frequency

The frequency $f_3$ determined from the non-zero probability of a variation in flow rate determined is obtained from the non-zero probability p(t) of a variation in consumption flow rate of the fluid higher than the flow rate variation threshold obtained from a plurality of measurements of values of the consumption flow rate d(t) of the fluid acquired during a period of time at least equal to one day and the frequency $f_3$ determined from the non-zero probability is proportional to the non-zero probability p(t).

In other words, the active parameterisable frequency can be determined from the non-zero probability of consumption flow rate of the fluid higher than the flow rate threshold obtained if the quantity measured has a periodicity greater than a predefined threshold, i.e. a sufficient periodicity for a significant probability of flow rate being able to be calculated for a predetermined interval of time.

Updating the Active Parameterisable Frequency

According to a particular provision, at the step (e), the active parameterisable frequency is updated according to the value of the flow rate acquired according to $$f_{act} = \frac{1}{3}\sum_{j=1}^{3} a_j \cdot f_j$$

According to an alternative provision, at the step (e), the active parameterisable frequency is updated according to the value of the flow rate acquired according to $f_{act}$=max ($f_1$, $f_2$, $f_3$)

It is specified that the formula (i.e. the calculation) for updating the active parameterisable frequency can be selected by a user.

Definition of the Incrementation Threshold

According to a particular provision, the method comprises a step (f) in which the active parameterisable frequency $f_{act}$ is compared with a predetermined frequency threshold (step 105), if the active parameterisable frequency $f_{act}$ is strictly lower than the frequency threshold, then the incrementation threshold value N is defined by a first predetermined incrementation threshold value (step 106), if the active parameterisable frequency is higher than or equal to the frequency threshold, then the incrementation threshold value N is defined by a second predetermined incrementation threshold value (step 107).

The incrementation thresholds are predetermined thresholds that can be fixed by a user of the meter 1.

The invention claimed is:

1. A method for managing a communicating meter, for measuring consumption of a fluid, the communicating meter being configured for acquiring measurements of consumption of the fluid at a parameterisable frequency, the communicating meter comprising a cell providing an autonomous source of electrical energy, an increase in the parameterisable frequency causing an increase in an electricity consumption of the communicating meter and therefore a reduction in a service life of the cell, wherein the method is implemented by the communicating meter and comprises the following steps:

(a) acquiring at least one value of a consumption flow rate of the fluid at an active parameterisable frequency $f_{act}$, (b) incrementing a value V of a number of acquisitions of values of the flow rate acquired at the active parameterisable frequency $f_{act}$, (c) comparing the value V with a threshold value N, (d) as long as the value V is lower than the threshold value N, maintaining the active parameterisable frequency $f_{act}$ and reimplementation of the method with the maintained active parameterisable frequency to acquire at least one new value of the flow rate at the maintained active parameterisable frequency, and (e) when the value V is eventually at least equal to the threshold value N, updating the active parameterisable frequency $f_{act}$ at least according to the value of the flow rate acquired, according to at least one other flow rate value previously acquired and according to a frequency $f_3$ determined from a non-zero probability p(t) of a variation in consumption flow rate of the fluid higher than a flow rate variation threshold, and reimplementation of the method with the updated active parameterisable frequency to acquire at least one new value of the flow rate at the updated active parameterisable frequency, said updating of the active parameterisable frequency making it possible to guarantee a precise measurement of the flow rate, and therefore of the consumption of the fluid, while making it possible to optimise an electrical consumption of the communicating meter, and therefore to extend an ability of the cell to provide an electrical energy to the communicating meter.

2. The method according to claim 1, wherein the active parameterisable frequency $f_{act}$ is updated according to a first frequency $f_1$ determined according to the flow rate value acquired, the first frequency $f_1$ being determined as follows:

$$f_1 = \frac{d(t) - d_{min}}{d_{max} - d_{min}} \cdot [f_{max} - f_{min}] + f_{min}$$

with: $f_{min}$ a predetermined minimum frequency, $f_{max}$ a predetermined maximum frequency, $d_{min}$ a measurable minimum flow rate value and $d_{max}$ a measurable maximum flow rate value, and d(t) a flow rate value measured at an instant t.

3. The method according to claim 2, wherein the active parameterisable frequency $f_{act}$ is updated as follows:

$$f_{act} = \frac{1}{3}\sum_{j=1}^{3} a_j \cdot f_j$$

with $f_2$ a second frequency determined according to a variation in the flow rate value d(t) acquired with respect to said at least one other flow rate value previously acquired.

4. The method according to claim 2, wherein the frequency $f_3$ determined from the non-zero probability p(t) of a variation in consumption flow rate higher than the flow rate variation threshold is obtained from a plurality of measurements of values of the consumption flow rate of the fluid acquired during a period of time at least equal to one day and the frequency $f_3$ determined from the non-zero probability p(t) is proportional to the non-zero probability p(t), and wherein the active parameterisable frequency $f_{act}$ is updated as follows:

$$f_{act} = \max(f_1, f_2, f_3)$$

with $f_2$ a second frequency determined according to a variation in the flow rate value d(t) acquired with respect to said at least one other flow rate value previously acquired.

5. The method according to claim 2, wherein the frequency $f_3$ determined from the non-zero probability p(t) of a variation in consumption flow rate higher than the flow rate variation threshold is obtained from a plurality of measurements of values of the consumption flow rate of the fluid acquired during a period of time at least equal to one day and the frequency $f_3$ determined from the non-zero probability p(t) is proportional to the non-zero probability p(t), and wherein the active parameterisable frequency $f_{act}$ is updated as follows.

6. The method according to claim 1, wherein the frequency $f_3$ determined from the non-zero probability p(t) of a variation in consumption flow rate higher than the flow rate variation threshold is obtained from a plurality of measurements of values of the consumption flow rate of the fluid acquired during a period of time at least equal to one day and the frequency $f_3$ determined from the non-zero probability p(t) is proportional to the non-zero probability p(t).

7. A non-transient storage medium on which a computer program product is stored, comprising program code instructions for executing the method according to claim 1, when the instructions are read from the non-transient storage medium and executed by a processor of a communicating meter for measuring consumption of a fluid.

8. A communicating meter, for measuring consumption of a fluid, the communicating meter being configured for acquiring measurements of consumption of the fluid at a parameterisable frequency, the communicating meter comprising a cell providing an autonomous source of electrical energy, an increase in the parameterisable frequency causing an increase in an electricity consumption of the communicating meter and therefore a reduction in a service life of the cell, wherein the communicating meter comprises electronic circuitry configured for:

(a) acquiring at least one value of a consumption flow rate of the fluid at an active parameterisable frequency $f_{act}$, (b) incrementing a value V of a number of acquisitions of values of the flow rate acquired at the active parameterisable frequency $f_{act}$, (c) comparing the value V with a threshold value N, (d) as long as the value V is lower than the threshold value N, maintaining the active parameterisable frequency $f_{act}$ and reimplementation of the method with the maintained active parameterisable frequency to acquire at least one new value of the flow rate at the active maintained parameterisable frequency, and (e) when the value V is eventually at least equal to the threshold value N, updating the active parameterisable frequency $f_{act}$ at least according to the value of the flow rate acquired, according to at least one other flow rate value previously acquired and according to a frequency determined from a non-zero probability p(t) of a variation in consumption flow rate of the fluid higher than a flow rate variation threshold, and reimplementation of the method with the updated active parameterisable frequency to acquire at least one new value of the flow rate at the updated active parameterisable frequency, said updating of the active parameterisable frequency making it possible to guarantee a precise measurement of the flow rate, and therefore of the consumption of the fluid, while making it possible to optimise an electrical consumption of the communicating meter, and therefore to extend the ability of the cell to provide an electrical energy to the communicating meter.

* * * * *